(12) United States Patent
Matsuyama et al.

(10) Patent No.: US 11,097,357 B2
(45) Date of Patent: Aug. 24, 2021

(54) DRILL BIT AND HOLE FORMATION METHOD

(71) Applicant: Mitsubishi Gas Chemical Company, Inc., Tokyo (JP)

(72) Inventors: Yousuke Matsuyama, Yonezawa (JP); Takaaki Ogashiwa, Yonezawa (JP); Noritsugu Umehara, Nagoya (JP); Shintarou Oyama, Nagoya (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 16/883,703

(22) Filed: May 26, 2020

(65) Prior Publication Data

US 2020/0282471 A1 Sep. 10, 2020

Related U.S. Application Data

(62) Division of application No. 16/309,420, filed as application No. PCT/JP2017/018905 on May 19, 2017, now abandoned.

(30) Foreign Application Priority Data

Jun. 13, 2016 (JP) .............................. JP2016-117239

(51) Int. Cl.
*B23B 35/00* (2006.01)
*B23B 51/06* (2006.01)
(Continued)

(52) U.S. Cl.
CPC .............. *B23B 35/00* (2013.01); *B23B 51/00* (2013.01); *B23B 51/02* (2013.01); *B23B 51/06* (2013.01);
(Continued)

(58) Field of Classification Search
CPC ......... B23B 35/00; B23B 51/00; B23B 51/02; B23B 51/06
See application file for complete search history.

(56) References Cited

U.S. PATENT DOCUMENTS

| 2,646,701 A | 7/1953 | Letien |
| 3,460,409 A | 8/1969 | Stokey |

(Continued)

FOREIGN PATENT DOCUMENTS

| CA | 2960464 A1 | 3/2016 |
| EP | 2431565 A1 | 3/2012 |

(Continued)

OTHER PUBLICATIONS

International Search Report for PCT/JP2017/018905, dated Jul. 25, 2017, and English Translation (5 pages).

*Primary Examiner* — Eric A. Gates
(74) *Attorney, Agent, or Firm* — Fitch, Even, Tabin & Flannery LLP

(57) ABSTRACT

Provided are a hole formation method enabling the formation of a high-quality hole even when a workpiece material is a difficult-to-machining metal material or a fiber-reinforced composite material and a drill bit used in the method. A drill bit includes at least one cutting edge and a face (a leading flank and a trailing flank) positioned in the vicinity of the cutting edge, and on the face, a recess exhibiting a prescribed planar shape (groove) is provided. A hole formation method includes a hole formation step of machining a portion to be processed of a workpiece material by means of drilling to form a hole while a lubricant material for assisting machining process is in contact with the portion to be processed, and in the hole formation step, the drill bit is used.

10 Claims, 1 Drawing Sheet

(51) Int. Cl.
  *B23B 51/02* (2006.01)
  *B23B 51/00* (2006.01)
(52) U.S. Cl.
  CPC ..... *B23B 2215/04* (2013.01); *B23B 2226/275* (2013.01); *B23B 2250/12* (2013.01); *B23B 2251/18* (2013.01)

(56) References Cited

U.S. PATENT DOCUMENTS

| | | | |
|---|---|---|---|
| 4,565,471 A * | 1/1986 | Negishi | B23B 51/02 408/204 |
| 5,314,272 A | 5/1994 | Kubota | |
| 5,338,135 A | 8/1994 | Noguchi et al. | |
| 5,695,303 A | 12/1997 | Boianjiu et al. | |
| 6,200,077 B1 | 3/2001 | Svenningsson et al. | |
| 6,481,938 B2 | 11/2002 | Widin | |
| 6,984,094 B2 | 1/2006 | Nuzzi et al. | |
| 9,144,845 B1 | 9/2015 | Grzina et al. | |
| 10,029,316 B2 * | 7/2018 | Dyer | B23K 26/362 |
| 10,357,832 B2 | 7/2019 | Ogawa | |
| 2013/0051944 A1 * | 2/2013 | Wenzelburger | B23B 51/0486 408/83 |
| 2016/0045961 A1 | 2/2016 | Umehara et al. | |
| 2017/0274461 A1 | 9/2017 | Mabuchi et al. | |
| 2017/0341159 A1 | 11/2017 | Ogawa | |

FOREIGN PATENT DOCUMENTS

| | | |
|---|---|---|
| EP | 2979832 A1 | 2/2016 |
| JP | H08-511208 A | 11/1996 |
| JP | 2001-287110 A | 10/2001 |
| JP | 2006-150557 A | 6/2006 |
| JP | 2009-148865 A | 7/2009 |
| JP | 2009-148895 A | 7/2009 |
| JP | 2012-210689 A | 11/2012 |
| KR | 10-2015-0133210 A | 11/2015 |
| TW | 201446397 A | 12/2014 |
| WO | 2014/157570 A1 | 10/2014 |
| WO | 2016/047803 A1 | 3/2016 |
| WO | 2016/063893 A1 | 4/2016 |

* cited by examiner

DRILL BIT AND HOLE FORMATION METHOD

CROSS-REFERENCE TO RELATED APPLICATIONS

This application is a division of U.S. application Ser. No. 16/309,420, filed Mar. 22, 2019, which is a U.S. national phase application filed under 35 U.S.C. § 371 of International Application PCT/JP2017/018905, filed May 19, 2017, designating the United States, which claims priority from Japanese Application Number 2016-117239, filed Jun. 13, 2016.

FIELD OF THE INVENTION

The present invention relates to a drill bit and a hole formation method.

BACKGROUND OF THE INVENTION

At present, metal materials (mainly, an aluminum alloy) are adopted as materials of the body structures of aircraft (structural materials). Although heat-resistant alloys such as a titanium alloy and stainless steel are used for portions capable of having high temperatures, including jet exhaust portions and portions around afterburners in the airframe structure, the conventional aluminum alloy will have insufficient strength due to aerodynamic heating of higher-speed aircraft that are being developed. On this account, the harder titanium alloy or stainless steel should be used as the structural material of a main airframe structure. Such structural materials constituting the airframe of aircraft are intended to be drilled, and the formed holes are used to join metal materials to each other or to join a metal material to a structural material of another material such as CFRP with bolts.

For such metal hole forming, some techniques have been disclosed. For example, the titanium alloy is a difficult-to-machining material and thus shortens the hole-forming life of a drill. To address such a problem, for example, a method in which a cutting oil is sprayed for processing and a method in which the shape of a drill is changed to reduce the load on the drill and to suppress the reduction of the drill service life have been disclosed (for example, see Patent Document 1).

In recent years, fiber-reinforced composite materials (especially, a carbon fiber-reinforced plastic (CFPR) having high tensile strength or high tensile elasticity) have been increasingly used as outer panels of aircraft and vehicles, for example. In the specification, the CFRP means a plastic produced by heat molding or heat pressure molding of a prepreg, which is prepared by impregnating carbon fibers with a matrix resin, or two or more stacked prepregs. A member formed from the CFRP is fixed to a structure with a fastening element such as a bolt and a rivet. On this account, to fix the CFRP to a structure such as an aircraft part, a machining process, specifically, hole forming is involved to form many holes in the CFRP for penetration of fastening elements.

In order to form high-quality holes in a CFRP by hole forming, some techniques have been disclosed. For example, a method of gradually changing the shape of a tool, for example, the curvature or the point angle of a cutting face of a drill has been disclosed (for example, see Patent Document 2).

CITATION LIST

Patent Document

Patent Document 1: Japanese Patent Application Laid-open No. 2006-150557
Patent Document 2: Japanese Patent Application Laid-open No. 2012-210689

SUMMARY

To form a hole in a metal, a drill is commonly used, but even when a drill for metal is used, the hole-forming life of the drill is short, and when a common drill is used, the hole-forming life of the drill is extremely short. As the number of processed holes increases, the drill blade is abraded to deteriorate the quality of processed holes. Specifically, a processed hole is likely to have a smaller inner diameter, and burrs are likely to be formed at the outlet side of a penetrating drill. Due to the abrasion of a drill, a clearance may generate between a metal material and a structural material of another material such as CFRP that are fastened with a bolt, causing floating between these structural materials or causing machining chips to get into the formed clearance. Such a phenomenon is considered to be a fatal defect. As described above, the abrasion of a drill blade is highly likely to result in quality problems of processed holes. In such circumstances, especially high-quality hole forming is required for production of an aircraft structure using a titanium alloy material, and it is extremely important to solve problems including the hole-forming life of a drill and the floating between a metal material and a different structural material.

When a drill is used to form a hole in a metal, frictional heat is generated between the rotating drill and the metal to locally increase the temperature around the processed hole. When many holes are processed, the drill and the metal as a workpiece material accordingly store heat as the number of processed holes increases. If having a low thermal conductivity, the metal insufficiently releases the heat, and the temperature around processed holes increases. In such a case, when the temperature of a metal increases, the metal softens, and burrs are formed on a processed hole at the outlet side of the penetrating drill. In some cases, machining chips of a metal are welded to a drill due to processing heat, and an excess load is applied to the drill to stop the processing apparatus. As described above, thermal storage during hole forming is highly likely to result in quality problems of processed holes. In such circumstances, especially high-quality hole forming is required for production of an aircraft structure using a titanium alloy material and the like, and it is extremely important to solve the problems of burrs.

In order to suppress such thermal storage of a portion to be processed and a drill, wet working using a cutting oil or the like has been performed. However, the wet working involves washing after completion of a machining process. When an oil is left around or in a processed hole, a screw as a fastening tool for fastening through the hole may deteriorate, or a fastened portion may loosen. Such a defect may lead to fatal accidents. To address this, Patent Document 1 discloses an improvement of the processability of metals that are difficult to form holes from the viewpoint of machining tools and machining methods, but the effect is still insufficient.

To form a hole in a fiber-reinforced composite material, a drill is also commonly used. In common hole forming by a drill, the hole-forming life of the drill is extremely short, and as the number of processed holes increases, the drill blade is abraded to deteriorate the quality of processed holes. Specifically, a processed hole is likely to have a smaller inner diameter; carbon fibers are likely to fluff at the outlet side of a penetrating drill (hereinafter also called "splintering": a phenomenon in which some of the fibers constituting a fiber-reinforced composite material are not cut down and are left as splintering around a processed hole); and prepreg layers constituting a fiber-reinforced composite material are likely to separate (hereinafter also called delamination). An abraded drill blade may form a processed hole having an uneven inner diameter, and delamination may be caused from an unevenness of a processed hole as a starting point. Such a phenomenon is considered to be a fatal defect. As described above, the abrasion of a drill blade is highly likely to result in quality problems of processed holes. In such circumstances, especially high-quality hole forming is required for production of an aircraft structure using CFRP and the like, and it is extremely important to solve problems including the fluffing and delamination.

In CFRP hole forming, as the tool abrasion proceeds to increase the machining resistance, quality problems of processed holes are likely to be caused. In particular, a high-strength CFRP for aircraft or the like contains carbon fibers at high density, thus a drill scratches the carbon fibers more frequently, and the machining tool is more rapidly abraded. As a countermeasure, a tool is exchanged earlier to maintain hole qualities, and this increases the proportion of the tool cost in the processing costs at present. To address this, Patent Document 2 discloses an improvement of the processability of fiber-reinforced composite materials that are difficult to form holes (for example, CFRPs) from the viewpoint of tools, but the effect is still insufficient.

In view of such circumstances, the present invention is intended to provide a hole formation method enabling the formation of a high-quality hole even when a workpiece material is a difficult-to-machining metal material or a fiber-reinforced composite material and to provide a drill bit used in the method.

The inventors of the present invention have carried out intensive studies for achieving the above objects. As a result, the inventors have found that the objects can be achieved by machining a workpiece material with a lubricant material for assisting machining process and a drill bit having a recess on the surface of a tip, and have completed the present invention.

In other words, the present invention is as follows.

[1] A drill bit used to form a hole by machining a portion to be processed of a workpiece material by means of drilling while a lubricant material for assisting machining process is in contact with the portion to be processed, the drill bit including
at least one cutting edge, and
a face positioned in a vicinity of the cutting edge,
on the face, a recess exhibiting a prescribed planar shape being provided.

[2] The drill bit according to the aspect [1], in which
the face includes a leading flank adjacent to the cutting edge, and
the recess is provided on the leading flank.

[3] The drill bit according to the aspect [1] or [2], in which
the face includes a leading flank adjacent to the cutting edge and a trailing flank adjacent to the leading flank, and
the recess is provided on the trailing flank.

[4] The drill bit according to any one of the aspects [1] to [3], in which the recess is a substantially linear groove formed substantially parallel to the cutting edge.

[5] The drill bit according to the aspect [4], in which a dimension between the cutting edge and the groove is set to be 0.25 mm or more and 0.43 mm or less.

[6] The drill bit according to the aspect [4] or [5], in which the groove is set to have an average width of 0.23 mm or more and 0.30 mm or less.

[7] The drill bit according to any one of the aspects [1] to [6], in which the recess is set to have a maximum depth of 0.05 mm or more and 0.15 mm or less.

[8] A hole formation method including
a hole formation step of machining a portion to be processed of a workpiece material by means of drilling to form a hole while a lubricant material for assisting machining process is in contact with at least one of a drill bit and the portion to be processed,
in the hole formation step, the drill bit according to any one of the aspects [1] to [7] is used.

[9] The hole formation method according to the aspect [8], in which the lubricant material for assisting machining process has a sheet shape.

[10] The hole formation method according to the aspect [8] or [9], in which
the workpiece material has a thickness of 1.0 mm or more, and
a hole formed in the hole formation step has a diameter of 3.0 mm or more.

[11] The hole formation method according to any one of the aspects [8] to [10], in which the workpiece material is a difficult-to-machining metal material.

[12] The hole formation method according to any one of the aspects [8] to [10], in which the workpiece material is a fiber-reinforced composite material.

[13] The hole formation method according to any one of the aspects [8] to [10], in which the workpiece material is a material in which a difficult-to-machining metal material is in close contact with a fiber-reinforced composite material.

[14] The hole formation method according to the aspect [11] or [13], in which the difficult-to-machining metal material is any one material selected from the group consisting of a titanium alloy, an aluminum alloy, a magnesium alloy, a low alloy steel, a stainless steel, and a heat-resistant alloy.

[15] The hole formation method according to the aspect [11] or [13], in which the difficult-to-machining metal material is a Ti-6Al-4V titanium alloy.

According to the present invention, a hole formation method enabling the formation of a high-quality hole even when a workpiece material is a difficult-to-machining metal material or a fiber-reinforced composite material and a drill bit used in the method can be provided.

DESCRIPTION OF EMBODIMENTS

Embodiments of the present invention will now be described with reference to drawings. The following embodiments are merely preferred application examples, and the scope of the present invention is not limited to them.
<Drill Bit>

Figure 1:
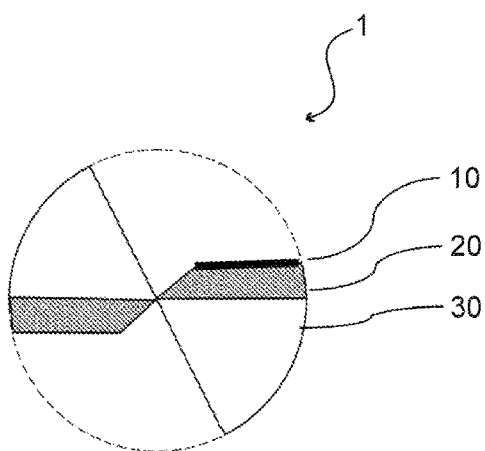
FIG. 1 is a schematic view of a point of a drill bit pertaining to an embodiment of the present invention.
Figure 2:
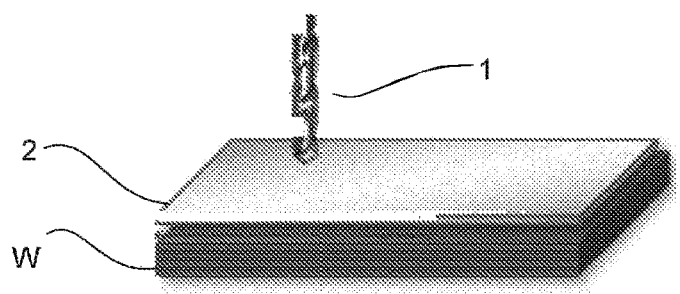
FIG. 2 is a schematic view showing an example hole formation method pertaining to an embodiment of the present invention.
Figure 3:
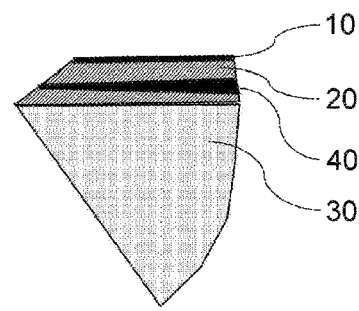
FIG. 3 is an enlarged view of a point of a drill bit pertaining to an embodiment of the present invention.

With reference to FIG. 1 to FIG. 3, the structure of a drill bit 1 pertaining to an embodiment of the present invention will be described. A drill bit 1 pertaining to the present embodiment is, as shown in FIG. 2, used to form a hole by machining a portion to be processed of a workpiece material W by means of drilling while a lubricant material for assisting machining process (hereinafter also called "lubricant material") 2 is in contact with the portion to be processed. The point of the drill bit 1, as shown in FIG. 1, has a pair of cutting edges 10 and faces positioned in the vicinity of the corresponding cutting edges 10 (leading flanks 20 adjacent to the cutting edges 10 and trailing flanks 30 adjacent the leading flanks 20). In the present embodiment, two cutting edges 10 are adopted as an example, but at least one cutting edge 10 can be provided, and three or more cutting edges may be provided. In the present embodiment, the trailing flanks 30 adjacent to the leading flanks 20 are provided as an example, but the trailing flanks 30 are not necessarily provided. In the present invention, the "leading flank" means a face that is provided just adjacent to a cutting edge and is in contact with the cutting edge, and is not what is called a "body clearance" (a face formed to leave a margin width in a fluted land of a drill in order to form a clearance between the outer periphery of a drill and a portion to be processed, for preventing friction during a machining process).

On each leading flank 20 of the drill bit 1, a recess exhibiting a prescribed planar shape is provided. As the recess, for example, as shown in FIG. 3, a substantially linear groove 40 formed substantially parallel to each cutting edge 10 can be adopted.

When such a groove 40 is adopted as the recess, the dimension between the cutting edge 10 and the groove 40 is preferably set to be 0.25 mm or more and 0.43 mm or less. If the dimension between a cutting edge 10 and a groove 40 is less than 0.25 mm, the lubricant material 2 temporarily held on the groove 40 is unlikely to be supplied onto the entire leading flank 20, and the lubricating effect may be reduced to increase the temperature during a machining process. Hence, such a condition is unfavorable. If the dimension between a cutting edge 10 and a groove 40 is more than 0.43 mm, the lubricant material 2 is unlikely to be supplied to the cutting edge 10, thus the cutting performance of a penetrating drill bit 1 is unlikely to be maintained, and burrs are likely to be formed on a part to be an outlet of the drill bit 1 (outlet side). Hence, such a condition is unfavorable.

The groove 40 is preferably set to have a (maximum) depth of 0.05 mm or more and 0.15 mm or less. If a groove 40 has a depth of less than 0.05 mm, the lubricant material 2 is unlikely to be spread on the point of a drill bit 1, thus the lubricating effect may be reduced, and burrs are likely to be formed on a workpiece material W. In addition, the friction coefficient between a workpiece material W and a contact face on the point of a drill bit 1 may increase, and the frictional temperature may increase. Hence, such a condition is unfavorable. If a groove 40 has a depth of more than 0.15 mm, a face with the groove 40 of a drill bit 1 may have lower strength, thus the face may be broken during processing, and the hole quality may deteriorate. Hence, such a condition is unfavorable.

The groove 40 is preferably set to have a width (average) of 0.23 mm or more and 0.30 mm or less. If a groove 40 has a width of less than 0.23 mm, the lubricant material 2 is unlikely to be spread on the point of a drill bit 1, thus the lubricating effect is reduced, and burrs are likely to be formed on a workpiece material W. Hence, such a condition is unfavorable. If a groove 40 has a width of more than 0.30 mm, a face with the groove 40 of a drill bit 1 may have lower strength, thus the face may be broken during processing, and the hole quality may deteriorate. Hence, such a condition is unfavorable.

The recess is not limited to the substantially linear groove 40 formed substantially parallel to the corresponding cutting edge 10, and recesses exhibiting various planar shapes can be adopted. Examples of the recess include a substantially linear groove formed to have a prescribed angle (for example, about 30°) to the corresponding cutting edge 10, a groove having a gradually increasing width as the distance from the rotating center of a drill bit 1 increases outward in the radial direction, a latticed groove, a wavy groove, and substantially circular, substantially elliptical, and substantially polygonal recesses in a planar view. The recesses can be provided not only on the leading flanks 20 of the drill bit 1 but also on the trailing flanks 30 (the recesses may be provided on the trailing flanks 30 in place of the leading flanks 20).

As described above, the drill bit 1 can include at least one cutting edge 10, a face positioned in the vicinity of the cutting edge 10 (a leading flank 20 or a trailing flank 30), and a recess provided on the face and exhibiting a prescribed planar shape (for example, a groove 40), and other shapes and structures (for example, the number of cutting edges 10, the point angle of the drill bit 1, and the torsion angle of grooves) can be appropriately set. The material of the drill bit 1 is preferably a cemented carbide prepared by sintering a hard metal carbide powder. Examples of such a cemented carbide include, but are not necessarily limited to, a metal prepared by sintering a mixture of tungsten carbide and cobalt as a binder. Such a cemented carbide may contain titanium carbide, tantalum carbide, or the like for further improving material properties depending on intended purposes. The drill bit 1 preferably has a diameter of 1 mmφ or more and 10 mmφ or less, and more preferably 2 mmφ or more and 7 mmφ or less, which is typically used for hole forming in aircraft base materials.

<Hole Formation Method>

Next, a hole formation method using the drill bit 1 pertaining to the present embodiment will be described.

A hole formation method pertaining to the present embodiment includes a hole formation step of machining a portion to be processed of a workpiece material W by means of drilling to form a hole while a lubricant material for assisting machining process 2 is in contact with a drill bit 1 and/or the portion to be processed, and in the hole formation step, the drill bit 1 pertaining to the present embodiment is used.

FIG. 2 is a schematic view showing an example hole formation method of the present embodiment. As shown in FIG. 2, a lubricant material 2 is used to form a hole in a workpiece material W (especially, a difficult-to-machining material). Specifically, the lubricant material 2 is placed at a portion of a workpiece material W to be an inlet of the drill bit 1 (approaching face), and the drill bit 1 is used to process the workpiece material W. In the hole formation method of the embodiment, the hole formation step may be any step in which a portion to be processed of a workpiece material W is cut by means of drilling to form a hole while the lubricant material 2 is in contact with the drill bit 1 and/or the portion to be processed. For example, the drill bit 1 having been in contact with the lubricant material 2 can be used to perform drilling. "While being in contact" is not limited to particular conditions, and, for example, includes a case in which a contact step of bonding the lubricant material 2 to the drill bit 1 is performed before drilling, and then the drill bit 1 with the lubricant material 2 is used to perform drilling, a case in which a close contact step of bringing the lubricant material 2 into close contact with a portion to be processed of a workpiece material W, and then the portion to be processed of the workpiece material W is cut from the side with the lubricant material 2, and a combination case of them.

When such a method is adopted, the drill bit 1 in which recesses (for example, grooves 40) are provided on faces (for example, leading flanks 20) positioned in the vicinity of the corresponding cutting edges 10 is used to form a hole by machining a portion to be processed of a workpiece material W by means of drilling while the lubricant material 2 is in contact with the portion to be processed, and thus a lubricating component of the lubricant material 2 can be temporarily held on the recesses of the drill bit 1. Accordingly, the lubricating component of the lubricant material 2 can be readily spread on the point of the drill bit 1 (the cutting edges 10, the leading flanks 20, the trailing flanks 30, for example), and thus the lubricant material 2 can achieve higher lubricating effect. As a result, even when the workpiece material W is a difficult-to-machining metal material, burrs on the workpiece material W at the outlet side of the drill bit 1 can be suppressed, and even when the workpiece material W is a fiber-reinforced composite material, chippings of the workpiece material W or splintering can be reduced. Accordingly, a high-quality hole can be formed. In addition, the lubricant material 2 can achieve higher lubricating effect, and thus the frictional resistance between the workpiece material W and the surface of the drill bit 1 can be suppressed to reduce the load on the drill bit 1. As a result, the service life of each drill bit 1 can be prolonged, and the productivity can be improved.

[Contact Step]

The hole formation method pertaining to the present embodiment may be any method in which a portion to be processed of a workpiece material W is cut by means of drilling to form a hole while the lubricant material for assisting machining process 2 is in contact with the drill bit 1 and/or the portion to be processed, and may include a contact step as needed. The contact step is a step of bringing the lubricant material 2 into contact with the drill bit 1 before hole formation. The method is not specifically limited. For example, by placing the lubricant material 2 on a drill bit 1 approaching face, the lubricant material 2 can be bonded to the drill bit 1 before hole formation. By forming a hole while the lubricant material 2 is in contact with the drill bit 1, the lubricant material 2 can be bonded to the drill bit 1. By previously applying the lubricant material 2 to the drill bit 1, the lubricant material 2 can be bonded to the drill bit 1. By cutting and hole-forming the lubricant material 2 by the drill bit 1 before hole formation, the lubricant material 2 can be bonded to the drill bit 1.

[Close Contact Step]

The hole formation method of the embodiment may include a close contact step of previously bringing the lubricant material 2 into close contact with the portion to be processed of the workpiece material W. The close contact position on the workpiece material W with the lubricant material 2 may be a part to be an inlet of the drill bit 1 or both parts to be an inlet and an outlet of the drill bit 1. Accordingly, the load on the drill bit 1 can be reduced as described above, and burrs, chippings, or splintering formed around a hole can be reduced. The "part to be an outlet" can also be expressed as a face to be an outlet when the part is a face. Similarly, the "part to be an inlet" can also be expressed as a face to be an inlet.

Examples of the method of bringing the workpiece material W into close contact with the lubricant material 2 include, but are not necessarily limited to, a method of physically fixing the lubricant material 2 and the workpiece material W with a clip or a jig and a method of forming a layer of a compound having tackiness (adhesive layer) on a surface of the lubricant material 2 that comes into contact with a metal as the workpiece material W. Specifically, a method of using a lubricant material 2 with an adhesive layer eliminates the necessity of fixing with a jig or the like and thus is preferred. In the present specification, a layer of a compound having tackiness used for fixing a workpiece material W and a lubricant material 2 is defined as an adhesive layer.

[Hole Formation Step]

The hole formation step is a step of machining a workpiece material W by means of drilling to form a hole while a lubricant material 2 is in contact with a drill bit 1 and/or a portion to be processed of the workpiece material W. When the lubricant material 2 is used as described above to, for example, perform hole forming (especially, continuous hole forming), the lubricity between the drill surface including groove surfaces on the side face of the drill bit 1 and the inner wall surface of a processed hole is improved to facilitate the discharge of materials (carbon fibers, for example) machined by cutting edges 10 of the drill bit 1, and the frequency and degree of scratching between the cutting edges 10 of the drill bit 1 and the inner wall surface of the processed hole are reduced. Accordingly, the abrasion of the cutting edges 10 of the drill bit 1 is supposed to be suppressed. The diameter of the hole formed in the hole formation step is not limited to particular values and is 3 mm or more. The diameter of a hole can be adjusted by the diameter of a drill bit 1 used.

In the hole formation step, a common machining technique can be used. To perform a machining process, for example, the machining process can be performed while a gas or a liquid is used to cool a portion to be processed of a workpiece material W and/or a drill bit 1. Examples of the method of cooling a portion to be processed of a workpiece material W and/or a drill bit 1 by using a gas include a method in which a compressed gas is supplied to a portion to be processed of a workpiece material W and/or a drill bit 1 and a method in which a gas around a portion to be processed of a workpiece material W and/or a drill bit 1 is sucked, and accordingly a gas is supplied to the portion to be processed of the workpiece material W and/or the drill bit 1 from the periphery.

[Lubricant Material for Assisting Machining Process]

Examples of the lubricant material for assisting machining process 2 used in the hole formation method of the embodiment include, but are not necessarily limited to, a lubricant material for assisting machining process containing a polymer material and an inorganic filler. Specifically preferred is a lubricant material 2 containing a polymer material such as a water-soluble or water-insoluble thermoplastic resin or thermosetting resin and an inorganic filler such as graphite, molybdenum disulfide, tungsten disulfide, and a molybdenum compound. More specifically, a lubricant material 2 containing a high molecular weight compound (A) having a weight average molecular weight of $5 \times 10^4$ or more and $1 \times 10^6$ or less, a medium molecular weight compound (B) having a weight average molecular weight of not less than $1 \times 10^3$ and less than $5 \times 10^4$, and a carbon (C) is more preferred. By using such a lubricant material 2, the load on a drill bit 1 can be further reduced, and burrs, chippings, or splintering formed around a hole can be more likely to be reduced.

The lubricant material for assisting machining process 2 may have any shape as long as a portion to be processed of a workpiece material W can be cut by means of drilling to form a hole while the lubricant material 2 is in contact with a drill bit 1 and/or the portion to be processed, and examples include a sheet-shaped lubricant material 2, a block lubricant material 2 having a round bar shape, a square bar shape, or the like, and a lubricant material 2 in a molten state. Specifically, a sheet-shaped lubricant material is preferred.

The lubricant material for assisting machining process 2 may be a single layer containing a polymer material and an inorganic filler or may be a laminate including a layer containing a polymer material and an inorganic filler and additional layers. Examples of the additional layer include an adhesive layer for improving the adhesion between the lubricant material 2 and a workpiece material W and a protective layer for preventing the surface of the lubricant material 2 from being scratched. The structure of the lubricant material for assisting machining process 2 will next be described.

(High Molecular Weight Compound (A))

The high molecular weight compound (A) can function as a lubricant, improves the lubricity of the lubricant material for assisting machining process 2, and can exert the effect of reducing chippings, burrs, or splintering formed around a hole. The high molecular weight compound (A) can further function as a forming agent, improves the formability of the lubricant material 2, and can exert the effect of single layer formability (a substance itself can form a layer (sheet) without any supporting substrate). The high molecular weight compound (A) may be any compound having a weight average molecular weight of $5 \times 10^4$ or more and $1 \times 10^6$ or less, and examples include water-soluble or water-insoluble thermoplastic resins and thermosetting resins. Specifically, a water-soluble thermoplastic resin and/or a water-insoluble thermoplastic resin is preferred, and a water-soluble thermoplastic resin is more preferred. Examples of the water-soluble or water-insoluble thermoplastic resin include, but are not necessarily limited to, the water-soluble resins and water-insoluble resins described below. The "water-soluble resin" means such a polymer compound that 1 g or more of the polymer compound is dissolved in 100 g of water at 25° C. and 1 atmosphere. The high molecular weight compound (A) may be a single compound or a combination of two or more of such compounds.

When a water-soluble resin is used, the discharging performance of cutting dust during a machining process is likely to be improved due to the lubricity of the water-soluble resin. When containing a water-soluble resin, the lubricant sheet for assisting machining process obtains appropriate softness as the surface hardness, and thus the load on a drill bit 1 can be more likely to be reduced. In addition, a resin component adhering to a portion to be processed of a workpiece material W can be easily removed after a machining process. Examples of the water-soluble resin include, but are not necessarily limited to, polyalkylene oxide compounds such as polyethylene oxide, polypropylene oxide, and polyethylene oxide-propylene oxide copolymers; polyalkylene glycols such as polyethylene glycol and polypropylene glycol; ester compounds of polyalkylene glycols; ether compounds of polyalkylene glycols; monostearate compounds of polyalkylene glycols, such as polyethylene glycol monostearate, polypropylene glycol monostearate, and polyglycerol monostearate; water-soluble urethanes; water-soluble polyether resins; water-soluble polyesters; sodium poly(meth)acrylate; polyacrylamide; polyvinylpyrrolidone; polyvinyl alcohol; sugars such as cellulose and derivatives thereof; and modified polyamides. Specifically, polyethylene oxide, polyethylene glycol, and water-soluble polyether resins are preferred from the above viewpoint.

When a water-insoluble resin is used, the lubricant sheet for assisting machining process is likely to have a higher surface hardness than when a water-soluble resin is used. Hence, for example, the biting performance of a drill bit 1 during drilling is improved, and a hole can be formed at an intended position. In addition, the lubricant sheet for assisting machining process has higher rigidity, and the handling properties are improved. Examples of the water-insoluble resin include, but are not necessarily limited to, urethane polymers; acrylic polymers; vinyl acetate polymers; vinyl chloride polymers; polyester polymers; polystyrene resins such as polyethylene wax, styrene homopolymers (GPPS), styrene-butadiene copolymers (HIPS), styrene-(meth)acrylic acid copolymers (for example, MS resin); and copolymers of them.

The high molecular weight compound (A) has a weight average molecular weight of $5 \times 10^4$ or more, preferably $6 \times 10^4$ or more, more preferably $1 \times 10^5$ or more, and even more preferably $1.25 \times 10^5$ or more. The high molecular weight compound (A) has a weight average molecular weight of $1 \times 10^6$ or less, preferably $8 \times 10^5$ or less, more preferably $7 \times 10^5$ or less, and even more preferably $6 \times 10^5$ or less. A high molecular weight compound (A) having a weight average molecular weight of $5 \times 10^4$ or more further improves the formability. A high molecular weight compound (A) having a weight average molecular weight of $1 \times 10^6$ or less further improves the lubricity. When two or more high molecular weight compounds (A) are used, each compound preferably satisfies the above weight average molecular weight. In the present embodiment, the weight average molecular weight can be determined by the method described in examples (the same applies hereinafter).

The high molecular weight compound (A) may include a high molecular weight compound (A-1) having a weight average molecular weight of $3 \times 10^5$ or more and $1 \times 10^6$ or less and/or a high molecular weight compound (A-2) having a weight average molecular weight of not less than $5 \times 10^4$ and less than $3 \times 10^5$, and preferably includes both the high molecular weight compound (A-1) and the high molecular weight compound (A-2). When the high molecular weight compound (A-1) and the high molecular weight compound (A-2) are used in combination, the formability and the lubricity are more likely to be improved.

The high molecular weight compound (A-1) has a weight average molecular weight of $3 \times 10^5$ or more, preferably $4 \times 10^5$ or more, more preferably $4.5 \times 10^5$ or more, and even more preferably $5 \times 10^5$ or more. The high molecular weight compound (A-1) has a weight average molecular weight of $1 \times 10^6$ or less, preferably $8 \times 10^5$ or less, more preferably $7 \times 10^5$ or less, and even more preferably $6 \times 10^5$ or less.

In the lubricant material for assisting machining process 2, the content of the high molecular weight compound (A-1)

is preferably 5 parts by mass or more, more preferably 10 parts by mass or more, and even more preferably 15 parts by mass or more relative to 100 parts by mass of the high molecular weight compound (A), the medium molecular weight compound (B), and the carbon (C) in total. In the lubricant material 2, the content of the high molecular weight compound (A-1) is preferably 35 parts by mass or less, more preferably 30 parts by mass or less, and even more preferably 25 parts by mass or less relative to 100 parts by mass of the high molecular weight compound (A), the medium molecular weight compound (B), and the carbon (C) in total. When the content of the high molecular weight compound (A-1) is 5 parts by mass or more, the formability is more likely to be improved. When the content of the high molecular weight compound (A-1) is 35 parts by mass or less, the lubricity is more likely to be improved.

The high molecular weight compound (A-2) has a weight average molecular weight of $5 \times 10^4$ or more, preferably $6 \times 10^4$ or more, more preferably $1 \times 10^5$ or more, and even more preferably $1.25 \times 10^5$ or more. The high molecular weight compound (A-2) has a weight average molecular weight of less than $3 \times 10^5$, preferably $2.5 \times 10^5$ or less, and more preferably $2 \times 10^5$ or less.

In the lubricant material for assisting machining process 2, the content of the high molecular weight compound (A-2) is preferably 5 parts by mass or more, more preferably 10 parts by mass or more, and even more preferably 15 parts by mass or more relative to 100 parts by mass of the high molecular weight compound (A), the medium molecular weight compound (B), and the carbon (C) in total. In the lubricant material 2, the content of the high molecular weight compound (A-2) is preferably 35 parts by mass or less, more preferably 30 parts by mass or less, and even more preferably 25 parts by mass or less relative to 100 parts by mass of the high molecular weight compound (A), the medium molecular weight compound (B), and the carbon (C) in total. When the content of the high molecular weight compound (A-2) is 5 parts by mass or more, the lubricity is more likely to be improved. When the content of the high molecular weight compound (A-2) is 35 parts by mass or less, the formability is more likely to be improved.

In the lubricant material for assisting machining process 2, the content of the high molecular weight compound (A) is preferably 20 parts by mass or more, more preferably 25 parts by mass or more, and even more preferably 30 parts by mass or more relative to 100 parts by mass of the high molecular weight compound (A), the medium molecular weight compound (B), and the carbon (C) in total. In the lubricant material 2, the content of the high molecular weight compound (A) is preferably 60 parts by mass or less, more preferably 55 parts by mass or less, and even more preferably 50 parts by mass or less relative to 100 parts by mass of the high molecular weight compound (A), the medium molecular weight compound (B), and the carbon (C) in total. When the content of the high molecular weight compound (A) is 20 parts by mass or more, the lubricity is more likely to be improved. When the content of the high molecular weight compound (A) is 60 parts by mass or less, the formability is more likely to be improved. When the content of the high molecular weight compound (A) is within the above range, the load on a drill bit 1 is further reduced, and burrs, chippings, or splintering formed around a processed hole are more likely to be reduced.

(Medium Molecular Weight Compound (B))

The medium molecular weight compound (B) can function as a lubricant, improves the lubricity of the lubricant material for assisting machining process 2, and can exert the effect of reducing chippings, burrs, or splintering formed around a processed hole. The medium molecular weight compound (B) may be any compound having a weight average molecular weight of not less than $1 \times 10^3$ and less than $5 \times 10^4$, and examples include water-soluble or water-insoluble thermoplastic resins and thermosetting resins. Specifically, a water-soluble or water-insoluble thermoplastic resin is preferred, and a water-soluble thermoplastic resin is more preferred.

As the water-soluble or water-insoluble thermoplastic resin, a resin that is the same type as the above water-soluble resins or water-insoluble resins and has a weight average molecular weight within the above range can be used. Examples of other medium molecular weight compounds (B) include, but are not necessarily limited to, polyalkylene glycol compounds such as polyethylene glycol, polypropylene glycol, and polytetramethylene glycol; monoether compounds of polyalkylene oxides, such as polyethylene oxide oleyl ether, polyethylene oxide cetyl ether, polyethylene oxide stearyl ether, polyethylene oxide lauryl ether, polyethylene oxide nonylphenyl ether, and polyethylene oxide octylphenyl ether; monostearate compounds of polyalkylene oxides, such as polyethylene oxide monostearate, polyethylene oxide sorbitan monostearate, and polyglycerol monostearate; and polyalkylene oxide compounds such as polyethylene oxide, polypropylene oxide, and polyethylene oxide-propylene oxide copolymers. Specifically, polyethylene oxide monostearate is preferred. By using such a medium molecular weight compound (B), the lubricity is more likely to be improved. The medium molecular weight compound (B) may be a single compound or a combination of two or more of such compounds.

The high molecular weight compound (A) and the medium molecular weight compound (B), which have different molecular weights, can have different melt viscosities and different melting points. By using such a high molecular weight compound (A) and a medium molecular weight compound (B) in combination, the following effects are achieved. For example, when only the high molecular weight compound (A) is used, the lubricant material for assisting machining process 2 has a markedly high viscosity or a markedly high melting point, and accordingly the formability or lubricity of the lubricant material 2 is reduced. When only the medium molecular weight compound (B) is used, the lubricant material 2 has a markedly low viscosity or a markedly low melting point, and accordingly the formability or lubricity of the lubricant material 2 is reduced. The combination use can suppress such reduction. As a result, the load on a drill bit 1 is further reduced, and burrs, chippings, or splintering formed around a processed hole are more likely to be reduced.

The medium molecular weight compound (B) has a weight average molecular weight of $1 \times 10^3$ or more, preferably $1.25 \times 10^3$ or more, more preferably $1.5 \times 10^3$ or more, even more preferably $2 \times 10^3$ or more, still more preferably $2.5 \times 10^3$ or more, and particularly preferably $3 \times 10^3$ or more. The medium molecular weight compound (B) has a weight average molecular weight of less than $5 \times 10^4$, preferably $2.5 \times 10^4$ or less, more preferably $2 \times 10^4$ or less, even more preferably $1 \times 10^4$ or less, still more preferably $7.5 \times 10^3$ or less, and particularly preferably $5 \times 10^3$ or less. A medium molecular weight compound (B) having a weight average molecular weight of $1 \times 10^3$ or more further improves the formability. A medium molecular weight compound (B) having a weight average molecular weight of less than $5 \times 10^4$ further improves the lubricity.

In the lubricant material for assisting machining process 2, the content of the medium molecular weight compound (B) is preferably 10 parts by mass or more, more preferably 20 parts by mass or more, and even more preferably 30 parts by mass or more relative to 100 parts by mass of the high molecular weight compound (A), the medium molecular weight compound (B), and the carbon (C) in total. In the lubricant material 2, the content of the medium molecular weight compound (B) is preferably 75 parts by mass or less, more preferably 60 parts by mass or less, even more preferably 45 parts by mass or less, and still more preferably 40 parts by mass or less relative to 100 parts by mass of the high molecular weight compound (A), the medium molecular weight compound (B), and the carbon (C) in total. When the content of the medium molecular weight compound (B) is 10 parts by mass or more, the lubricity is more likely to be improved. When the content of the medium molecular weight compound (B) is 75 parts by mass or less, the formability is more likely to be improved. When the content of the medium molecular weight compound (B) is within the above range, the load on a drill bit 1 is further reduced, and burrs, chippings, or splintering formed around a processed hole are more likely to be reduced.

(Carbon (C))

The carbon (C) can function as a solid lubricant, improves the lubricity of the lubricant material for assisting machining process 2, and can exert the effect of prolonging the service life of a drill bit 1. In addition, the carbon (C) is present in a solid state having a volume at a temperature during a machining process and thus can maintain the lubricity during the machining process Examples of the carbon (C) include, but are not necessarily limited to, natural graphite, artificial graphite, activated carbon, acetylene black, carbon black, colloidal graphite, pyrolytic graphite, expanded graphite, and flake graphite. Specifically, flake graphite is preferred. When the carbon (C) includes flake graphite, the abrasion reduction performance is more likely to be improved. The carbon (C) may be a single carbon or a combination of two or more of such carbons.

In a machining process using the lubricant material for assisting machining process 2, especially in a continuous machining process, the carbon (C) adheres to the surface or grooves of a drill bit 1 and to the inner face of a processed hole in a workpiece material to exhibit lubricity. At the machining, the carbon (C) shows less changes in volume and hardness with temperature variation as compared with the high molecular weight compound (A) and the medium molecular weight compound (B). Hence, even when the temperature of a drill bit 1 or a processed portion increases during a machining process, a constant volume and hardness can be maintained. In other words, for example, when a machining process is performed, the carbon (C) is constantly present between a drill bit 1 and a workpiece material to improve the lubricity, thus can show a bearing-like effect, and provides the effect of suppressing the abrasion of a drill bit 1. The carbon (C) has a moderately higher hardness than other solid lubricants, and thus has excellent bearing effect and excellent lubricity. As a result, the load on a drill bit 1 is further reduced, and burrs, chippings, or splintering formed around a processed hole are more likely to be reduced.

The carbon (C) preferably has an average particle size of 50 μm or more, more preferably 100 μm or more, even more preferably 150 μm or more, and particularly preferably 200 μm or more. The carbon (C) preferably has an average particle size of 1,000 μm or less, more preferably 750 μm or less, even more preferably 500 μm or less, and particularly preferably 300 μm or less. When the average particle size of the carbon (C) is 50 μm or more, the lubricity and the formability are further improved, accordingly the load on a drill bit 1 is further reduced to prolong the service life of a drill, and burrs, chippings, or splintering formed around a processed hole are more likely to be reduced. When the average particle size of the carbon (C) is 1,000 μm or less, the abrasion of the point of a drill bit 1 is more likely to be reduced. When two or more carbons (C) are contained, each average particle size can satisfy the above range.

In the specification of the present application, the average particle size of the carbon (C) means a median diameter. The median diameter is a particle diameter at a 50% height on a cumulative distribution curve of particle sizes (based on number) (D50 value) and can be determined by the method described in examples.

In the lubricant material for assisting machining process 2, the content of the carbon (C) is preferably 5 parts by mass or more, more preferably 15 parts by mass or more, even more preferably 20 parts by mass or more, still more preferably 25 parts by mass or more, and particularly preferably 30 parts by mass or more relative to 100 parts by mass of the high molecular weight compound (A), the medium molecular weight compound (B), and the carbon (C) in total. In the lubricant material 2, the content of the carbon (C) is preferably 70 parts by mass or less, more preferably 65 parts by mass or less, and even more preferably 60 parts by mass or less relative to 100 parts by mass of the high molecular weight compound (A), the medium molecular weight compound (B), and the carbon (C) in total. When the content of the carbon (C) is 5 parts by mass or more, the lubricity is more likely to be improved. When the content of the carbon (C) is 70 parts by mass or less, the formability is more likely to be improved. When the content of the carbon (C) is within the above range, the load on a drill bit 1 is further reduced, and burrs, chippings, or splintering formed around a processed hole are more likely to be reduced.

(Additional Components)

The lubricant material for assisting machining process 2 may contain additional components as needed. Examples of the additional components include a lubricity improving component, a formability improving component, a plasticizer, a softening agent, a surface control agent, a leveling agent, an antistatic agent, an emulsifier, an antifoaming agent, a wax additive, a coupling agent, a rheology control agent, an antiseptic agent, an antifungal agent, an antioxidant, a light stabilizer, a nucleating agent, an organic filler, an inorganic filler, a solid lubricant, a heat stabilizer, and a coloring agent.

Examples of the lubricity improving component include, but are not necessarily limited to, amide compounds such as ethylenebisstearamide, oleamide, stearamide, and methylenebisstearamide; fatty acid compounds such as lauric acid, stearic acid, palmitic acid, and oleic acid; fatty acid ester compounds such as butyl stearate, butyl oleate, and glycol laurate; aliphatic hydrocarbon compounds such as liquid paraffin; and higher aliphatic alcohols such as oleyl alcohol. At least one component of them can be selected.

Examples of the formability improving component include, but are not necessarily limited to, thermosetting resins such as an epoxy resin, a phenol resin, a cyanate resin, a melamine resin, a urea resin, and a thermosetting polyimide. At least one component of them can be selected.

When a lubricant material for assisting machining process 2 containing a plasticizer or a softening agent is placed on a curved surface of a workpiece material W (for example, CFRP), the stress or distortion on the lubricant material 2 is reduced, for example, thus the lubricant material 2 can be prevented from cracking, and the curved surface following properties is more likely to be improved. Examples of the plasticizer and the softening agent include, but are not necessarily limited to, phthalic acid esters, adipic acid esters, trimellitic acid esters, polyesters, phosphoric acid esters, citric acid esters, epoxidized vegetable oils, and sebacic acid esters.

Examples of the solid lubricant other than the carbon (C) include, but are not necessarily limited to, molybdenum disulfide, tungsten disulfide, molybdenum compounds, polytetrafluoroethylene, and polyimide.

(Adhesive Layer)

The lubricant material for assisting machining process 2 may have an adhesive layer on a face to come into contact with a workpiece material W. When an adhesive layer is provided, the adhesion between the lubricant material 2 and a workpiece material W is more likely to be improved.

The adhesive layer may contain any component, and examples of the component include thermoplastic resins and/or thermosetting resins. Examples of the thermoplastic resin include, but are not necessarily limited to, urethane polymers, acrylic polymers, vinyl acetate polymers, vinyl chloride polymers, polyester polymers, and copolymers of them. Examples of the thermosetting resin include, but are not necessarily limited to, resins such as a phenol resin, an epoxy resin, a melamine resin, a urea resin, an unsaturated polyester resin, an alkyd resin, a polyurethane, a thermosetting polyimide, and a cyanate resin. Specifically, acrylic polymers are preferred, and solvent type acrylic adhesives and acrylic emulsion adhesives (aqueous type) are more preferred because no residual adhesive is left on a workpiece material to be machined (for example, CFRP) and such characteristics as to enable easy adhesion at normal temperature are required.

The adhesive layer may contain, in addition to components for the adhesive layer, deterioration inhibitors such as an antioxidant and inorganic fillers such as calcium carbonate, talc, and silica as needed.

When the lubricant material for assisting machining process 2 is removed from a workpiece material W after a machining process, the amount of the lubricant material 2 and/or the components of the adhesive layer adhering to the workpiece material W is preferably $1.0 \times 10^{-8}$ g or less and more preferably $5.0 \times 10^{-9}$ g or less in 1 mm$^2$ of the contact portion between the workpiece material W and the lubricant material 2 and of the portion to be processed. The lower limit of the amount of the lubricant material 2 and/or the components of the adhesive layer adhering to the workpiece material W is not limited to particular values and is preferably 0.

(Thickness)

The thickness of the lubricant material for assisting machining process 2 except the adhesive layer is appropriately set depending on the machining method of a workpiece material W for machining, a disconnection method, the area and volume of a portion to be processed, the diameter of a drill bit 1 used for hole forming, the structure and thickness of CFRP, and the like, and thus is not limited to particular values. Specifically, the lubricant material 2 preferably has a thickness of 0.1 mm or more, more preferably 0.2 mm or more, and even more preferably 0.5 mm or more. The lubricant material 2 preferably has a thickness of 20 mm or less, more preferably 10 mm or less, and even more preferably 5 mm or less. When the lubricant material 2 has a thickness of 0.1 mm or more, the machining stress is sufficiently reduced. For example, when drilling is performed, the load on a drill bit 1 is reduced, and breaking of a drill bit 1 is more likely to be prevented. When a lubricant material 2 having a thickness of 20 mm or less is used to perform drilling, folding of the lubricant material 2 on a drill bit 1 is suppressed, and the lubricant material 2 is more likely to be prevented from cracking.

In addition, a resin contained in the lubricant material for assisting machining process 2 is prevented from functioning as a binder for cutting powder, and the cutting powder is likely to be prevented from staying in a processed hole. Accordingly, unevenness in a hole is likely to be prevented from enlarging. In other words, a lubricant material 2 having an appropriate composition and an appropriate thickness can provide higher lubricity. For example, when drilling is performed, cutting powder can be most appropriately discharged through grooves on the side face of a drill bit 1. In order to further achieve the effects of the invention, the total thickness of the lubricant material 2 is preferably appropriately adjusted within the above range, and a plurality of thin lubricant materials 2 can be stacked.

The thickness of the adhesive layer is not limited to particular values and is preferably 0.01 mm or more and more preferably 0.05 mm or more. The lubricant material for assisting machining process 2 preferably has a thickness of 5 mm or less and more preferably 2.5 mm or less.

The thickness of each layer constituting the lubricant material for assisting machining process 2 is determined by the following procedure. First, a cross section polisher (CROSS-SECTION POLISHER SM-09010 manufactured by JEOL DATUM Ltd.) or an ultramicrotome (EM UC7 manufactured by Leica) is used to cut down a lubricant material 2 in a perpendicular direction to the lubricant material 2. Next, a scanning electron microscope (SEM, VE-7800 manufactured by KEYENCE) is used to observe a cross section from the perpendicular direction to the cross section, and the thickness of each layer constituting the lubricant material 2 is measured. At the measurement, thicknesses are measured at five points for one field of view, and the average is calculated as the thickness of the corresponding layer.

[Method for Producing Lubricant Material for Assisting Machining Process]

The method for producing the lubricant material for assisting machining process 2 is not limited to particular methods, and a conventionally known method in which a resin composition containing a resin such as a polymer material and a filler (for example, an inorganic filler) is formed into a sheet or a block having a round bar shape, a square bar shape, or the like can be widely used. Examples include a method in which a high molecular weight compound (A), a medium molecular weight compound (B), and a carbon (C) are mixed in the presence of a solvent or in the absence of a solvent, the mixture is applied onto a substrate, cooled, and solidified to form a sheet, and the substrate is removed to yield a lubricant material 2 and a method in which a high molecular weight compound (A), a medium molecular weight compound (B), and a carbon (C) are mixed in the presence of a solvent or in the absence of a solvent, the mixture is extruded into a sheet shape, and the sheet is drawn, as needed, to yield a lubricant material 2.

When the lubricant material for assisting machining process 2 is such a laminate as described above (for example, a lubricant sheet for assisting machining process including an adhesive layer and a protective layer), examples of the method for producing the laminate include, but are not necessarily limited to, a method in which a layer is formed directly on at least one side of a previously produced layer and a method in which a previously produced layer is bonded to another layer with an adhesive resin or by heat laminating.

The method of forming an adhesive layer on the surface of a lubricant material for assisting machining process 2 may be any known method used industrially. Specifically, examples include a method of forming an adhesive layer by rolling, curtain coating, spraying, or the like and a method of previously forming an adhesive layer having an intended thickness by using a roller, a T-die extruder, or the like. The adhesive layer may have any thickness, and a suitable thickness can be appropriately set depending on the curvature of a workpiece material W or the structure of a lubricant material 2.

To produce a lubricant material for assisting machining process 2 in a molten state, a resin composition prepared by mixing a resin and a filler can be used as the lubricant material 2, or a resin composition prepared by mixing a resin, a filler, and a solvent can be used as the lubricant material 2.

[Workpiece Material]

Examples of the workpiece material W include a difficult-to-machining metal material, a fiber-reinforced composite material, and a composite material in which a fiber-reinforced composite material is in close contact with a difficult-to-machining metal material.

The difficult-to-machining metal material may be any metal commonly used as a structural material, and examples include titanium alloys, aluminum alloys, magnesium alloys, low alloy steels, stainless steels, and heat-resistant alloys. Specifically, titanium alloys are preferred, and of the titanium alloys, Ti-6Al-4V that is made from titanium, aluminum, and vanadium and has higher strength is particularly preferred. The tensile strength of the titanium alloy is twice as high as that of the aluminum alloy, and the titanium alloy is a material having excellent corrosion resistance and heat resistance but is a difficult-to-machining material having high hardness. Hence, special machining conditions or a drill bit 1 having a special shape is required in related art. Use of the lubricant material for assisting machining process 2 eliminates special machining conditions or use of a drill bit 1 having a special shape, and the service life of a drill bit 1 can also be prolonged. From the viewpoint of applications, a metal material used as, for example, a material of the body structure of aircraft is preferred. As a metal has a higher strength, using the lubricant material 2 provides a more marked effect of prolonging the service life of a drill bit 1. The difficult-to-machining metal material may be a single material or a laminate of two or more of such materials.

In the present embodiment, the "difficult-to-machining metal material" has a Vickers hardness of 100 or more. The Vickers hardness can be determined in accordance with JIS Z 2244: 2009, "Vickers hardness test-Test method".

When the workpiece material W is a fiber-reinforced composite material densely containing fibers, a large amount of fibers are cut, and cutting edges 10 of a drill bit 1 are likely to be abraded. By using the lubricant material for assisting machining process 2, the abrasion of the cutting edges 10 of the drill bit 1 can be suppressed. When a carbon fiber-reinforced plastic is processed by an abraded drill bit 1, carbon fibers are forcedly cut, thus stacked prepregs are likely to cause delamination, and consequently uncut carbon fibers are more likely to be formed at the outlet side of a penetrating drill bit 1 unfortunately. However, by using the lubricant material 2, splintering can be further suppressed.

When the fiber-reinforced composite material is a UD material, a fiber buckling portion is likely to be formed on the inner wall of a hole by cutting edges 10 of a drill bit 1 entering at such an angle as to bite and scoop carbon fiber bundles. By using the lubricant material for assisting machining process 2, fiber buckling is suppressed, and a temperature increase due to frictional heat is also suppressed. Hence, a matrix resin is unlikely to reach the glass transition point (temperature) or the softening point thereof, thus tightly bundled carbon fibers can be maintained, and fiber buckling can be suppressed. The "UD material" is a fiber-reinforced composite material including a cloth material in which fibers are arranged unidirectionally.

The fiber-reinforced composite material may be any composite material including a matrix resin and reinforced fibers. Examples of the matrix resin include, but are not necessarily limited to, thermosetting resins such as an epoxy resin, a phenol resin, a cyanate resin, a vinyl ester resin, and an unsaturated polyester resin; and thermoplastic resins such as an acrylonitrile-butadiene-styrene (ABS) resin, a polyamide (PA) resin, a polypropylene (PP) resin, a polycarbonate (PC) resin, a methyl methacrylate resin, polyethylene, acrylic, and a polyester resin. Examples of the reinforced fibers include, but are not necessarily limited to, glass fibers, carbon fibers, and aramid fibers. The reinforced fibers may have any shape, and examples include filaments, tow, cloth, braids, chopped fibers, milled fibers, felt mats, paper, and prepregs. Specific examples of such a fiber-reinforced composite material include, but are not necessarily limited to, fiber-reinforced plastics (FRP) such as a carbon fiber-reinforced plastic (CFRP), a glass fiber-reinforced plastic (GFRP), and an aramid fiber-reinforced plastic (AFRP). Specifically preferred is a carbon fiber-reinforced plastic (CFRP), which has comparatively large tensile strength and tensile elasticity and has small density. The fiber-reinforced composite material may further contain an inorganic filler, an organic filler, or the like, as needed.

When the workpiece material W is a material in which a fiber-reinforced composite material is in close contact with a difficult-to-machining metal material, as for the penetrating order of a drill bit 1 through the workpiece material W, machining the difficult-to-machining metal material can be followed by machining the fiber-reinforced composite material, or machining the fiber-reinforced composite material can be followed by machining the difficult-to-machining metal material. For example, when the difficult-to-machining metal material is machined in advance, a drill bit 1 may be abraded before machining the fiber-reinforced composite material. When such an abraded drill bit 1 is used for processing, carbon fibers are forcedly cut, thus stacked prepregs are likely to cause delamination, and consequently uncut carbon fibers are more likely to be formed on the outlet portion of the penetrating drill bit 1 unfortunately. However, by using the lubricant material for assisting machining process 2, the abrasion of the drill bit 1 during a metal machining process is suppressed, and limitations on a machining process of a fiber-reinforced composite material, in which such abrasion is likely to affect the quality of a processed hole, can be greatly alleviated.

Examples of the composite material of a fiber-reinforced composite material and a difficult-to-machining metal material include, but are not necessarily limited to, a composite material in which a fiber-reinforced composite material and a difficult-to-machining metal material are stacked. Typically, the optimum machining condition greatly differs between the fiber-reinforced composite material and the difficult-to-machining metal material. For the fiber-reinforced composite material, a high rotation speed and a low feed speed are preferred, whereas for the difficult-to-machining metal material, a low rotation speed and a high feed speed are preferred. This is because for drilling of a difficult-to-machining metal material, the temperature increase of a drill bit 1 is suppressed to prevent the abrasion of cutting edges 10 of the drill bit 1. For such incompatible hole forming conditions as above, hole forming conditions are changed at the boundary between CFRP and a titanium alloy, or hole forming is performed in a moderate uniform condition, in practical processing. Alternatively, for example, to suppress the temperature increase of a drill bit 1 in drilling, the following measures have been performed at the time of hole formation in a titanium alloy for aircraft: a cutting oil is poured; or dust is collected by a dust collector while cold air is blown. However, using the lubricant material for assisting machining process 2 provides such a secondary effect as to greatly alleviate the limitations on hole forming conditions of a difficult-to-machining metal material that is likely to generate heat due to frictional heat.

The thickness of the workpiece material W is not limited to particular values and can be 1.0 mm or more. The upper limit of the thickness of the workpiece material W is not limited to particular values and is preferably 40 mm or less, for example. By adopting the hole formation method of the present invention, the abrasion of a drill bit 1 and the qualities of a machined portion (for example, a drilled hole) are more likely to be satisfactory even when a workpiece material W has a thickness of 1.0 mm or more.

EXAMPLES

The present invention will next be specifically described with reference to examples and comparative examples. The following examples are merely exemplified embodiments of the present invention, and the invention is not limited to them.

Table 1 shows a workpiece material W (a material subjected to hole forming), components used for production of a lubricant material for assisting machining process 2, an adhesive layer, a drill bit 1 used for hole forming, a hole forming apparatus, apparatuses used for evaluation, and the like used in examples and comparative examples.

TABLE 1

| Classification | Expression in table | Name | Trade name/model | Manufacturer | Remarks |
|---|---|---|---|---|---|
| Workpiece material | Ti | Titanium alloy plate | Ti-6Al-4V | | Thickness: 3 mmt, material equivalent to aircraft application |
| High molecular weight compound (A) | A-1 | Polyethylene oxide | ALKOX E-45 | Meisei Chemical Works, Ltd. | $Mw = 56 \times 10^4$ |
| | A-2 | Polyethylene oxide | ALKOX R-150 | Meisei Chemical Works, Ltd. | $Mw = 15 \times 10^4$ |
| | A-3 | Polyethylene oxide | ALTOP MG-150 | Meisei Chemical Works, Ltd. | $Mw = 15 \times 10^4$ |
| Medium molecular weight compound (B) | B-1 | Polyoxyethylene monostearate | NONION S-40 | NOF Corporation | $Mw = 35 \times 10^2$ |
| Carbon (C) | C-1 | Carbon (graphite) | RP99-150 | Ito Graphite Co., Ltd. | Flake, average particle size: 33 μm |
| Aluminum foil | — | High-purity aluminum foil | IN30-H18 | Mitsubishi Aluminum Co., Ltd. | Thickness: 0.15 mmt |
| Drill bit | — | Cemented carbide drill | RG-GDN | OSG Corporation | Diameter: 6.0 mmΦ Point angle: 120° Torsion angle: 40° Solid drill, without diamond coat |
| Texture processing apparatus | — | Wire electrical discharge machine | AQ327L | Sodick | — |
| Hole forming apparatus | — | Milling machine | — | Hitachi Seiko Ltd. | — |
| Evaluation apparatus | — | Laser microscope | VK-9700 | Keyence Corporation | — |
| | — | Infrared thermometer | InfReC Thermo GEAR G120EX | NEC Avio Infrared Technologies Co., Ltd. | — |

Each weight average molecular weight of the high molecular weight compounds (A) and the medium molecular weight compound (B) was determined as follows: a high molecular weight compound (A) or the medium molecular weight compound (B) was dissolved or dispersed in 0.05% salt solution and was subjected to liquid chromatography using a GPC (gel permeation chromatography) column with polyethylene glycol as the standard substance to determine the weight average molecular weight as a relative average molecular weight.

The median diameter of the carbon (C) was determined as follows: the carbon was dispersed in a solution containing a hexametaphosphoric acid solution and several drops of Triton; a laser diffraction particle size analyzer was used to determine a maximum length of each projected carbon particle; a cumulative distribution curve of particle sizes (based on number) was then prepared; and the particle diameter at a 50% height on the cumulative distribution curve was determined as the median diameter.

A titanium alloy plate (Ti-6Al-4V) as the workpiece material W had a Vickers hardness of 320.

Example 1

In Example 1, as a drill bit 1, on leading flanks 20 on the point of a cemented carbide drill (RG-GDN, manufactured by OSG Corporation), linear grooves 40 parallel to cutting edges 10 were formed by using a wire electrical discharge machine (AQ327 L, manufactured by Sodick) with a 0.2-mmΦ wire, and a drill bit d-1 was prepared (see Table 2). The distance between the groove 40 and the cutting edge 10 was 363 μm, the groove 40 had an average width of 263 μm, and the groove 40 had a maximum depth of 81 μm. The distance between the groove 40 and the cutting edge 10 and the width and the depth of the groove formed on the point of the drill bit were determined as follows: an image of the point of a drill bit 1 after grooving was recorded under a V-LASER microscope (VK-9700, manufactured by Keyence Corporation); and from the recorded data, calculation was performed by using an analysis software.

In Example 1, 7 parts by mass of a polyethylene oxide (ALKOX E-45, manufactured by Meisei Chemical Works, Ltd.), 13 parts by mass of a polyethylene oxide (ALTOP MG-150, manufactured by Meisei Chemical Works, Ltd.), 7 parts by mass of a polyethylene oxide (ALKOX R-150, manufactured by Meisei Chemical Works, Ltd.) as the high molecular weight compounds (A), 50 parts by mass of a polyethylene oxide monostearate (NONION S-40, manufactured by NOF CORPORATION) as the medium molecular weight compound (B), and 33 parts by mass of graphite (RP99-150, Ito Graphite Co., Ltd.) as the carbon (C) were molded with a single screw extruder at a temperature of 140° C., yielding a resin sheet having a thickness of 1.0 mm.

On one face of an aluminum foil (1N30-H18, manufactured by Mitsubishi Aluminum Co., Ltd.) having a thickness of 0.15 mm, a polyester resin layer (Vilonal MD-1200, manufactured by Toyobo Co., Ltd.) having a thickness of 0.01 mm was formed as an adhesion layer, giving adhesion layer-formed aluminum foils.

An adhesion layer-formed aluminum foil was stacked on the resin sheet so that the adhesion layer was in contact with the resin sheet, and on the resulting resin sheet, another adhesion layer-formed aluminum foil was stacked so that the adhesion layer was in contact with the resin sheet. The whole was subjected to thermal lamination to be integrated by using a laminating apparatus (OHL-2400, manufactured by ONC Inc.) at a temperature of 150° C., yielding a sheet of a lubricant material for assisting machining process 2 including three layers of adhesion layer-formed aluminum foil/resin sheet/adhesion layer-formed aluminum foil (lubricant sheet for assisting machining process).

The prepared lubricant sheet for assisting machining process was fixed to a drill bit 1 approaching face on a workpiece material W with a jig, and hole forming was performed in conditions shown in Table 3. The evaluation results of burrs around a processed hole at the outlet side of the drill bit 1 and the temperature of the drill bit 1 at the cutting are shown in Table 3.

Examples 2 to 4

Figure 4:
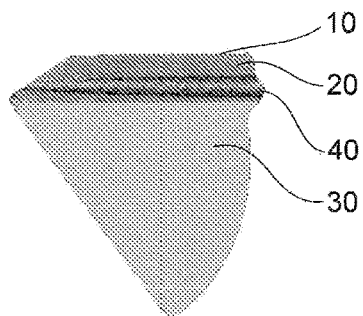
FIG. 4 is a photograph of a point of a drill bit used in Examples 1 to 4 of the present invention.

In Examples 2 to 4, grooves 40 having such shapes as shown in Table 2 were formed on the points of drill bits 1 in the same manner as in Example 1, and drill bits d-2 to d-4 were prepared. A lubricant sheet for assisting machining process prepared in the same manner as in Example 1 was fixed to a drill bit 1 approaching face on a workpiece material W with a jig, and hole forming was performed in conditions shown in Table 3. The evaluation results of burrs around a processed hole at the outlet side of the drill bit 1 and the temperature of the drill bit 1 at the cutting are shown in Table 3. FIG. 4 is a photograph of the point of the drill bit 1 used in Examples 1 to 4.

Comparative Example 1

Figure 5:
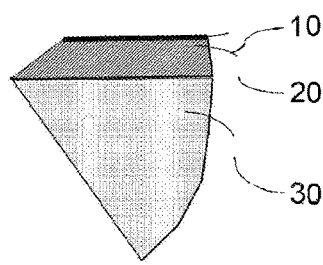
FIG. 5 is an enlarged view of a point of a drill bit used in Comparative Example 1.

In Comparative Example 1, a drill bit in which no groove was formed on the point was used. A lubricant sheet for assisting machining process prepared in the same manner as in Example 1 was fixed to a drill bit approaching face on a workpiece material W with a jig, and hole forming was performed in conditions shown in Table 3. The evaluation results of burrs around a processed hole at the outlet side of the drill bit and the temperature of the drill bit at the cutting are shown in Table 3. FIG. 5 is an enlarged view of the point of the drill bit used in Comparative Example 1.

[Evaluation: Height of Burrs of Processed Hole at Outlet Side of Drill Bit and Temperature of Drill Bit at Cutting]

In Examples 1 to 4 and Comparative Example 1, an image of the outlet side of a penetrating drill bit on the processed hole was recorded under a V-LASER microscope (VK-9700, manufactured by Keyence Corporation), and from the recorded data, the height of burrs of the processed hole at the outlet side of the drill bit was calculated by using an analysis software. At the measurement, the burr heights were measured at eight points, and the average was calculated as the burr height (in Examples and Comparative Example, burrs on the fifth hole were measured). In Examples 1 to 4 and Comparative Example 1, the temperature of a drill bit at cutting was measured by using an infrared thermometer (InfReC Themo GEAR G120EX, manufactured by NEC Avio Infrared Technologies Co., Ltd.). At a sampling period of 10 fps, the measurement was performed from the bottom face of a test piece immediately before penetration of a drill bit in a direction at 45° to the hole penetration direction.

TABLE 2

| Drill bit name | Groove formation area | Direction to cutting edge | Distance from cutting edge μm | Groove width μm | Groove depth μm |
|---|---|---|---|---|---|
| d-0 | Without groove | | | | |
| d-1 | Leading flank | Parallel | 363 | 263 | 81 |
| d-2 | Leading flank | Parallel | 369 | 255 | 71 |
| d-3 | Leading flank | Parallel | 400 | 280 | 101 |
| d-4 | Leading flank | Parallel | 428 | 269 | 106 |

TABLE 3

| | | Workpiece material | | Processing conditions | | | Number of processed holes Holes | Burrs around a processed hole at the outlet side of a drill bit μm | Drill bit temperature at cutting ° C. |
|---|---|---|---|---|---|---|---|---|---|
| Category | Drill bit Name | Material | Thickness mm | Drill bit diameter mmΦ | Rotation speed rpm | Feed speed mm/min | | | |
| Example 1 | d-1 | Ti | 3 | 6 | 500 | 25 | 5 | 45 | 174 |
| Example 2 | d-2 | Ti | 3 | 6 | 500 | 25 | 5 | 35 | 191 |
| Example 3 | d-3 | Ti | 3 | 6 | 500 | 25 | 5 | 45 | 173 |
| Example 4 | d-4 | Ti | 3 | 6 | 500 | 25 | 5 | 67 | 168 |
| Comparative Example 1 | d-0 | Ti | 3 | 6 | 500 | 25 | 5 | 69 | 197 |

As apparent from the above results, in Comparative Example 1 in which a drill bit having no groove on the point was used, burrs had a comparatively large height, and the drill bit had a comparatively high temperature at cutting, whereas in Examples 1 to 4 in which a drill bit 1 having grooves 40 on the point was used, burrs had comparatively small heights, and the drill bits 1 had comparatively low temperatures at the machining process.

The present invention is not intended to be limited to the above embodiments, and embodiments appropriately modified by a person skilled in the art are also encompassed within the scope of the invention as long as the feature of the present invention is retained. In other words, components included in the embodiments, the configurations, materials, conditions, shapes, sizes, and the like thereof are not limited to those exemplified and can be appropriately modified. Components included in the embodiments can be combined as long as such combinations are technically feasible. Such combinations are also encompassed within the scope of the invention as long as the feature of the present invention is retained.

The drill bit and the hole formation method pertaining to the present invention improve processing qualities and reduce processing costs in a machining process of a workpiece material (especially, a difficult-to-machining material) and have industrial applicability.

REFERENCE SIGNS LIST

1 drill bit
2 lubricant material for assisting machining process
10 cutting edge
20 leading flank
30 trailing flank
40 groove (recess)
W workpiece material

What is claimed is:

1. A hole formation method comprising:
   a hole formation step of machining a portion to be processed of a workpiece material by means of drilling to form a hole while a lubricant material for assisting machining process is in contact with at least one of a drill bit and the portion to be processed,
   wherein, in the hole formation step, the drill bit to be used includes:
   at least one cutting edge; and
   a face positioned in a vicinity of the cutting edge,
   wherein, on the face, a recess exhibiting a prescribed planar shape is provided;
   when the portion to be processed is machined by means of drilling to form a hole, the lubricant material for assisting machining process is held on the recess;
   the recess is set to have a maximum depth of 0.05 mm or more and 0.15 mm or less;
   the recess is a substantially linear groove formed substantially parallel to the cutting edge;
   a dimension between the cutting edge and the groove is set to be 0.25 mm or more and 0.43 mm or less; and
   the groove is set to have an average width of 0.23 mm or more and 0.30 mm or less.

2. The hole formation method according to claim 1, wherein the lubricant material for assisting machining process has a sheet shape.

3. The hole formation method according to claim 1, wherein the workpiece material has a thickness of 1.0 mm or more, and a hole formed in the hole formation step has a diameter of 3.0 mm or more.

4. The hole formation method according to claim 1, wherein the workpiece material is a difficult-to-machining metal material.

5. The hole formation method according to claim 4, wherein the difficult-to-machining metal material is any one material selected from the group consisting of a titanium alloy, an aluminum alloy, a magnesium alloy, a low alloy steel, a stainless steel, and a heat-resistant alloy.

6. The hole formation method according to claim 4, wherein the difficult-to-machining metal material is a Ti-6A1-4V titanium alloy.

7. The hole formation method according to claim 1, wherein the workpiece material is a fiber-reinforced composite material.

8. The hole formation method according to claim 1, wherein the workpiece material is a material in which a difficult-to-machining metal material is in close contact with a fiber-reinforced composite material.

9. The hole formation method according to claim 8, wherein the difficult-to-machining metal material is any one material selected from the group consisting of a titanium alloy, an aluminum alloy, a magnesium alloy, a low alloy steel, a stainless steel, and a heat-resistant alloy.

10. The hole formation method according to claim 8, wherein the difficult-to-machining metal material is a Ti-6A1-4V titanium alloy.

\* \* \* \* \*

UNITED STATES PATENT AND TRADEMARK OFFICE
CERTIFICATE OF CORRECTION

PATENT NO. : 11,097,357 B2  
APPLICATION NO. : 16/883703  
DATED : August 24, 2021  
INVENTOR(S) : Matsuyama et al.

Page 1 of 1

It is certified that error appears in the above-identified patent and that said Letters Patent is hereby corrected as shown below:

In the Claims

Column 24, Line (31):  
In Claim 6, please delete "Ti-6A1-4V" and insert -- Ti-6Al-4V --, therefor.

Column 24, Line (46):  
In Claim 10, please delete "Ti-6A1-4V" and insert -- Ti-6Al-4V --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*